March 19, 1946. N. W. KRASE ET AL 2,396,791
PROCESS FOR THE PREPARATION OF ETHYLENE POLYMERS
Filed Dec. 19, 1942
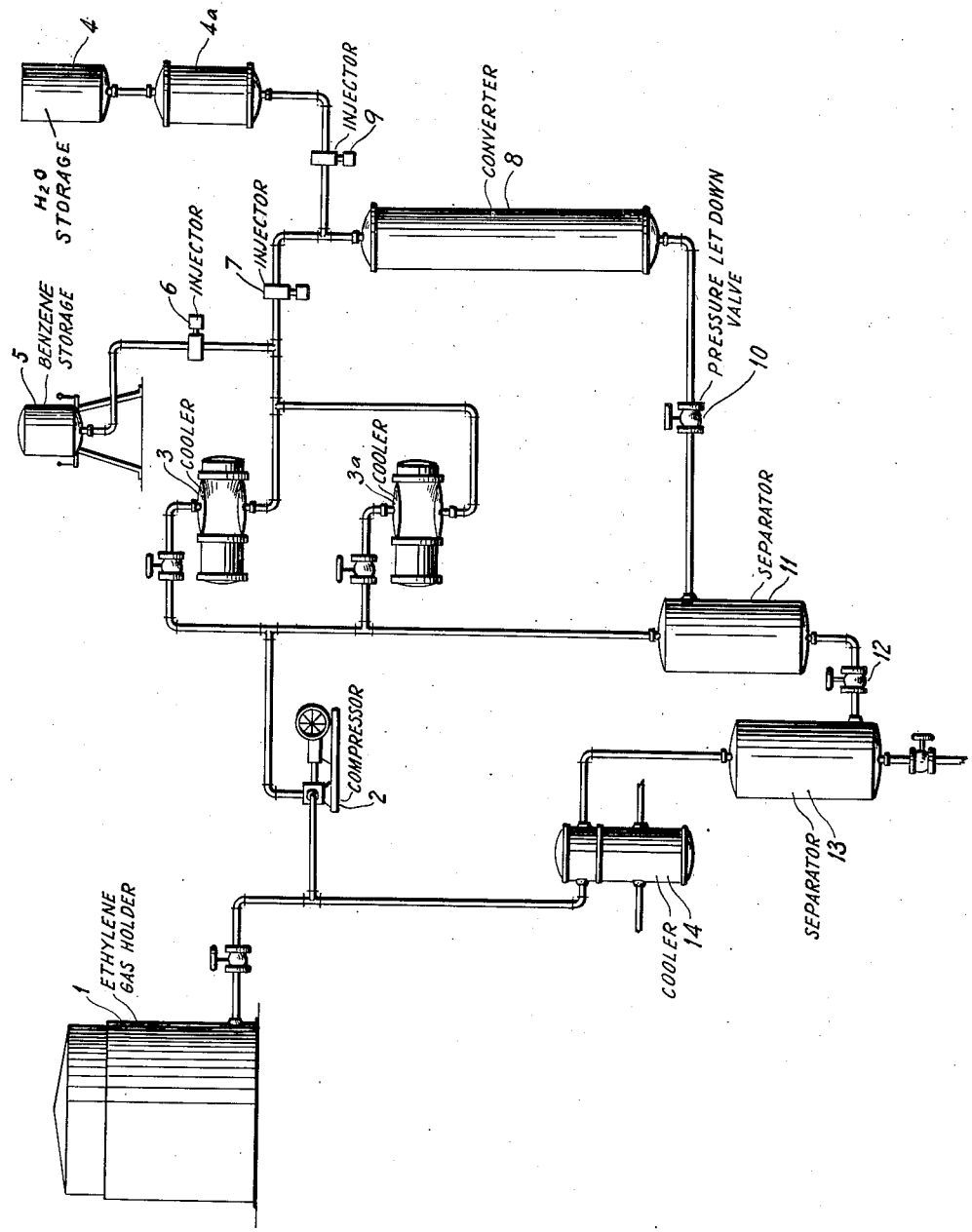
Norman W. Krase
Allen E. Lawrence INVENTORS
BY
ATTORNEY Patented Mar. 19, 1946

2,396,791

UNITED STATES PATENT OFFICE 2,396,791

PROCESS FOR THE PREPARATION OF ETHYLENE POLYMERS

Norman William Krase, Swarthmore, Pa., and Allen Everett Lawrence, Wilmington, Del., assignors to E. I. du Pont de Nemours & Company, Wilmington, Del., a corporation of Delaware Application December 19, 1942, Serial No. 469,532

5 Claims. (Cl. 260—94)

This invention relates to an improved process for the preparation of high molecular weight products of hydrocarbons containing a single ethylenic linkage and is more particularly related to an improved process for the polymerization of ethylene.

Various methods have been proposed for the polymerization of olefines such as ethylene with the principal object of obtaining high molecular weight products for various purposes. Oil-like products of relatively low molecular weight have been prepared from ethylene by its polymerization in the presence of acidic type catalysts while solid to semi-solid high molecular weight products of a polymeric nature have been obtained by effecting the polymerization in the absence of catalysts or in the presence of peroxygen-type, and other suitable catalysts by treatment at pressures above 50 atmospheres and up to 3,000 atmospheres or more. The invention of the instant case is principally directed toward products of the latter type.

An object of the present invention is to provide an improved process for the polymerization of hydrocarbons containing an ethylenic linkage. Another object is to provide a process for the preparation of high molecular weight products from ethylene in the presence of peroxygen-type catalysts wherein the reaction is conducted by a recycling process. A further object of the invention is to provide an improved process for the preparation of polymers of ethylene at elevated pressure wherein the unreacted ethylene is recycled in at least two circuits, each of which is under a different pressure. Other objects and advantages of the invention will hereinafter appear.

In the preparation of high molecular weight polymers of olefinic hydrocarbons containing an ethylenic linkage and more especially in the polymerization of ethylene and the preparation of high molecular weight polymers of ethylene with other organic compounds, in the presence of peroxygen-type or no catalysts, the reaction is conducted under very high pressures which may extend up to 4000 atmospheres and above. The products issuing from the reaction zone are under these high pressures and it has been found, in accord with the present invention, that efficient and economical operation of the process is effected if the pressure of the reactants issuing from the converter is lowered in steps. This pressure let-down results in a separation from the gases present of many of the products formed during the reaction. The gases which constitute principally the olefine used such, for example, as ethylene, are recycled to the system at the let-down pressure. Liquids and polymeric products separated at these pressures are then let-down to atmospheric pressure at which pressure the gases present are also recycled.

Alternatively, the process may be conducted by a plurality of intermediate pressure let-down steps. That is, the product produced is first separated and removed from the system and the pressure of the unreacted gases then lowered. This pressure lowering will result in precipitation of some of the products dissolved in the gases which products are separated and removed as before, and by a number of pressure lowering steps of this nature the products may be fractionated. If desired, the unreacted gases may be returned in part to the cycle after each pressure let-down step or contrariwise the gases after several such steps combined and then recycled.

By carrying out the conversion in this manner, the power consumption required for bringing the recycled gas up to reaction pressure is reduced, products of different and often superoir properties are produced, and perhaps of greatest importance, the danger of a run-away reaction during pressure separation is substantially eliminated. In contrast to this method of separation of the reactants, if the separation is effected at the pressure of conversion in order to recycle the unconverted gases under substantially that pressure, reaction takes place in the separator requiring temperature controlling means, catalyst destruction, or other suitable means to prevent a run-away reaction.

The invention will be more readily understood by reference to the attached drawing where ethylene, from the gas holder 1, which may or may not be a pressure holder, is drawn through compressor 2, wherein it is compressed from gas holder pressure to a pressure between 150 and 500 atmospheres and preferably between 200 and 300 atmospheres, is passed into the cooler 3, primarily for cooling the recycling gases, and from this cooler the compressed gases are joined by any addition agents, which it may be desired to use such, for example, as benzene which may be introduced through the storage tank 5 and introduced into the ethylene stream by means of the injector 6. The resulting mixture is drawn into the injector 7 and the pressure increased approximately to conversion pressures, for example, to a pressure between 800 and 4000 atmospheres or above. From this compressor, the reactants are introduced into the converter 8 into which there is simultaneously introduced water from storage tank 4 which is saturated with oxygen in saturator 4a and injected into the converter by means of the injection pump 9. In lieu of or together with using oxygen-containing water, a peroxide type catalyst may be injected into the system at this point. Within the converter the reaction is conducted at a temperature between 40° and 400° C. which temperature is controlled by suitable heating means not shown, the temperature within this range being governed by the type of reaction to be effected, i. e. the lower temperatures are employed for reactions involving the use of reacting addition agents such as the unsaturated compounds described below and the higher temperatures are generally employed when non-reacting or no addition agents are used. From converter 8 the reaction mixture is passed through a pressure let-down valve 10 wherein the pressure is reduced to below 500 atmospheres and preferably below 200 atmospheres, the reactants passing from this valve into the separator 11 in which the liquid and solid constituents separate from the gases, the latter being returned to the stream of ethylene on the pressure side of compressor 2. The liquid and solid constituents in separator 11 are passed through a let-down valve 12 into the second separator 13 which is at a lower and may be at substantially atmospheric pressure. From the bottom of separator 13 the products are removed through a pressure let-down valve, if necessary, and from the top thereof the evolved gases are drawn into compressor 2 for recycling, these gases being cooled in cooler 14 before being introduced into the ethylene stream.

Two coolers 3 and 3a are provided for it has been found that the vapors when recycled at pressures above 150 atmospheres contain appreciable quantities of the reaction products dissolved in the vapor and it is advisable to condense out these materials prior to passing the olefine gases again into the converter. Moreover, it is generally advisable to lower the temperature of the recycling gases to between approximately 20 and 80° C. prior to their compression to reaction pressures and accordingly it is more convenient to use two coolers; as one becomes charged with the product (precipitated by cooling from solution in the gas) it is cut out of the cycle and the other cut in while the first is treated with superheated steam or other means to remove the products contained. By this method it is possible to effect a continuous operation of the process without the necessity of shutting down operation for cleaning out a single cooler.

The reaction as broadly described above may be carried out in accord with the reaction in any suitable type of converter capable of withstanding the high pressures and it is preferably conducted in one having relatively great length to cross section.

The peroxygen-type catalyst which may be employed with the reaction includes molecular oxygen or air which may be present with respect to the olefine in amounts ranging from 5 to 2,000 P. P. M. (calculated as oxygen). While oxygen is the preferred catalyst other peroxygen-type catalysts may be used, alone or with oxygen, such catalysts including diethyl peroxide, hydrogen peroxide, persuccinic acid, lauroyl peroxide, tetralin peroxide, urea peroxide, butyryl peroxide, benzoyl peroxide, alkali metal and alkaline earth metal and ammonium persulfates, perborates, percarbonates and the like, the peroxygen type catalysts being preferably used at lower operating temperatures.

The reaction as has been stated may be conducted with any polymerizable aliphatic mono olefinic hydrocarbon by which is meant one that can be converted to a polymer in the presence of the aforesaid and like catalysts under the pressure and temperature conditions designated. Ethylene, propylene and isobutylene are the most prominent hydrocarbons of this case and of these the most important is ethylene.

The invention is not limited solely to the polymerization of the aforesaid hydrocarbons for it is known that ethylene can be interpolymerized with a variety of unsaturated compounds such as propylene, isobutylene, styrene, and similar mono olefinic hydrocarbons, vinyl esters, such as vinyl acetate, vinyl formate, and vinyl isobutyrates, as well as such acids as acrylic, methacrylic, itaconic, crotonic, and fumaric as well as their derivatives such as esters, acid halides, amides, and anhydrides. Ethylene will likewise form valuable interpolymers with vinyl halides such as a vinyl chloride and vinylidene chloride; vinyl cyanide and N-vinyl amides, vinyl ethers, divinyl formal, divinyl butyral and methyl vinyl ketone. This olefine will likewise form high molecular weight products in the presence of and with a number of compounds such, for example, as the halogenated hydrocarbons, the saturated aliphatic and aromatic acids, esters, anhydrides, aldehydes, alcohols, ethers, and so forth; and with sulfonyl halides, sulfur halides, and alkyl sulfates. All of these reactions and similar reactions can be conducted in accord with the invention.

I claim:

1. In a process for the preparation of normally semi-solid to solid polymers of ethylene in the presence of a catalyst selected from the group consisting of peroxy compounds and molecular oxygen, the steps which comprise continuously passing ethylene into a reaction zone at a temperature between 40° and 400° C. and conducting the polymerization therein at a pressure between 800 and 4000 atmospheres, continuously discharging the reaction mixture from the reaction zone, dropping the pressure on the reaction mixture to between 150 and 500 atmospheres, separating the normally semi-solid and solid constituents from the gases at the pressure between 150 and 500 atmospheres, recompressing the gases after said operation to polymerization pressure, returning the recompressed gases to the reaction zone, dropping the pressure on the normally semi-solid to solid constituents to approximately atmospheric pressure, removing the constituents, and recompressing the gas evolved from the constituents to polymerization pressures and returning the thus recompressed gas to the reaction.

2. In a process for the preparation of normally semi-solid to solid polymers of ethylene in the presence of a catalyst selected from the group consisting of peroxy compounds and molecular oxygen, the steps which comprise continuously passing ethylene into a reaction zone at a temperature between 40° and 400° C. and conducting the polymerization therein at a pressure between 800 and 4000 atmospheres, continuously discharging the reaction mixture from the reaction zone, dropping the pressure on the reaction mixture to between 150 and 500 atmospheres, separating the normally semi-solid and solid constituents from the gases at the pressure between 150 and 500 atmospheres, recompressing the gases after said operation to polymerization pressure, returning the recompressed gases to the reaction zone, dropping the pressure on the normally semi-solid to solid constituents to approximately atmospheric pressure, removing the constituents, and recompressing the gas evolved from the constituents to a pressure between 150 and 500 atmospheres and introducing the thus recompressed gas into the gas which is at that pressure.

3. In a process for the preparation of normally semi-solid to solid polymers of ethylene in the presence of a catalyst selected from the group consisting of peroxy compounds and molecular oxygen, the steps which comprise continuously passing ethylene into a reaction zone at a temperature between 40° and 400° C., after compressing the ethylene to a pressure between 800 and 4000 atmospheres, continuously discharging the reaction mixture from the zone and dropping the pressure of the mixture to between 200 and 300 atmospheres, separating the normally semi-solid to solid constituents from the gas at the pressure between 200 and 300 atmospheres, thereafter recycling the gas, after recompression, through the reaction zone, dropping the pressure on the normally semi-solid to solid constituents to approximately atmospheric pressure, separating therefrom any unconverted ethylene, recompressing this ethylene and returning the thus recompressed ethylene to the reaction zone.

4. In a process for the preparation of normally semi-solid to solid polymers of ethylene in the presence of a catalyst selected from the group consisting of peroxy compounds and molecular oxygen, the steps which comprise continuously passing ethylene into a reaction zone at a temperature between 40° and 400° C. after compressing the ethylene in two stages to reaction pressure, in the first stage compressing the ethylene to a pressure between 150 and 500 atmospheres, then cooling the thus compressed ethylene and again compressing it in the second stage to polymerization pressures ranging between 800 and 4000 atmospheres, subsequent to the reaction dropping the pressure to atmospheric pressure in two steps, in the first step to 150 and 500 atmospheres, and in the second step to atmospheric pressure, recycling after recompression the ethylene separated in the first step to the reaction zone, and the ethylene from the second step after recompression to a pressure between 150 and 500 atmospheres to the ethylene of the first step prior to its recompression but subsequent to its separation from products of the reaction.

5. In a process for the preparation of normally semi-solid to solid polymers of ethylene the steps which comprise continuously passing ethylene into a reaction zone at a temperature between 40° and 400° C. and conducting the polymerization therein at a pressure between 800 and 4000 atmospheres, continuously discharging the reaction mixture from the reaction zone, dropping the pressure on the reaction mixture to between 150 and 500 atmospheres, separating the normally semi-solid and solid constituents from the gases at the pressure between 150 and 500 atmospheres, recompressing the gases after said operation to polymerization pressure, returning the recompressed gases to the reaction zone, dropping the pressure on the normally semi-solid to solid constituents to approximately atmospheric pressure, removing the constituents, and recompressing the gas evolved from the constituents to polymerization pressures and returning the thus recompressed gas to the reaction.

NORMAN WILLIAM KRASE.
ALLEN EVERETT LAWRENCE.